United States Patent
Slivka et al.

(10) Patent No.: US 6,256,668 B1
(45) Date of Patent: Jul. 3, 2001

(54) METHOD FOR IDENTIFYING AND OBTAINING COMPUTER SOFTWARE FROM A NETWORK COMPUTER USING A TAG

(75) Inventors: Benjamin W. Slivka, Clyde Hill; Jeffrey S. Webber, Kirkland, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/169,618

(22) Filed: Oct. 9, 1998

Related U.S. Application Data

(62) Division of application No. 08/634,390, filed on Apr. 18, 1996, now Pat. No. 6,049,671.

(51) Int. Cl.$^7$ .................................................. G06F 13/00
(52) U.S. Cl. ............................................................ 709/220
(58) Field of Search ............................... 717/11; 709/200, 709/202, 203, 221, 316, 220, 218, 315; 341/55; 713/176; 380/4, 30; 705/59, 500, 501, 513, 515, 516

(56) References Cited

U.S. PATENT DOCUMENTS

| | | | |
|---|---|---|---|
| 4,796,181 | 1/1989 | Wiedemer | 364/406 |
| 5,047,928 | 9/1991 | Wiedemer | 364/406 |
| 5,142,680 | 8/1992 | Ottman et al. | 395/700 |
| 5,155,484 | 10/1992 | Chambers, IV | 341/55 |
| 5,155,680 | 10/1992 | Wiedemer | 364/406 |
| 5,155,847 | 10/1992 | Kirouac et al. | 395/600 |
| 5,267,171 | 11/1993 | Suzuki et al. | 364/479 |

(List continued on next page.)

OTHER PUBLICATIONS

Branwyn, "Getting Started," *Mosaic Quick Tour*, Ventana Press, Inc., Chapel Hill, NC, pp. 11–26, 1994.

Schroeder et al., "Windows 95 Rushes the Net: Netscape, Microsoft, Others Release New Browsers," *PC Week*, vol. 12, No. 34, p. 11, Aug. 28, 1995.

Branwyn, *Mosaic Quick Tour*, Ventana Press, Inc., Chapel Hill, NC, pp. 104–112, 1994.

Wingfield, "Netscape Inks Pact with Sun, Macromedia," *InfoWorld*, vol. 17, No. 22, p. 16, May 29, 1995.

Lichty, *American Online's Internet*; Windows Ed., pp. 135–178 (1994).

Lichty, *American Online* for Macintosh Tour Guide, 2$^{nd}$ Ed., Version 2.5, pp. 123–163 (1994).

(List continued on next page.)

*Primary Examiner*—Robert B. Harrell
(74) *Attorney, Agent, or Firm*—Klarquist Sparkman Campbell Leigh & Whinston, LLP

(57) ABSTRACT

Creators of computer software provide the most up-to-date versions of their computer software on an update service. A user who has purchased or downloaded free computer software calls an update service or a network service provider (e.g., an Internet provider) on a periodic basis. The update or network service automatically inventories the user computer to determine what computer software (e.g., a network browser) may be out-of-date, and/or need maintenance updates. If so desired by the user, the update service computer automatically downloads with a secure software transfer process and installs computer software to the user computer. By making periodic calls to an update or network service, the user always has the most up-to-date computer software immediately available. The update or network service may also alert the user to new products (i.e. including new help files, etc.), and new and enhanced versions of existing products which can be purchased electronically by a user and transferred immediately from the update or network service. When an upgrade is available, a tag in a hypertext document indicates an upgrade should be automatically downloaded from a location provided in the tag when the hypertext document is browsed by a computer having a browser.

23 Claims, 8 Drawing Sheets

U.S. PATENT DOCUMENTS

| | | | |
|---|---|---|---|
| 5,337,360 | 8/1994 | Fsicher | 713/176 |
| 5,367,686 | 11/1994 | Fisher et al. | 717/11 |
| 5,388,211 | 2/1995 | Hornbuckle | 395/200 |
| 5,390,247 | 2/1995 | Fischer | 713/176 |
| 5,421,009 | 5/1995 | Platt | 709/221 |
| 5,473,772 | 12/1995 | Halliwell et al. | 717/11 |
| 5,495,411 | 2/1996 | Ananda | 364/401 |
| 5,496,177 | 3/1996 | Collia et al. | 434/118 |
| 5,528,490 | 6/1996 | Hill | 717/11 |
| 5,548,645 | 8/1996 | Ananda | 380/4 |
| 5,555,416 | 9/1996 | Owens et al. | 717/11 |
| 5,586,304 | 12/1996 | Stupek, Jr. et al. | 717/11 |
| 5,586,322 | 12/1996 | Beck et al. | 395/616 |
| 5,638,446 | 6/1997 | Rubin | 380/25 |
| 5,654,901 | 8/1997 | Boman | 717/11 |
| 5,694,546 | 12/1997 | Reisman | 395/200.9 |
| 5,708,709 * | 1/1998 | Rose | 705/59 |
| 5,717,930 | 2/1998 | Imai et al. | 717/11 |
| 5,748,960 | 5/1998 | Fischer | 709/316 |
| 5,838,906 | 11/1998 | Doyle et al. | 709/202 |
| 5,845,077 | 12/1998 | Fawcett | 709/211 |
| 5,845,090 | 12/1998 | Collins, III et al. | 709/221 |
| 5,860,012 | 1/1999 | Luu | 395/712 |
| 6,016,520 | 1/2000 | Facq et al. . | |

OTHER PUBLICATIONS

Mori et al, "Superdistribution: The Concept and the Architecture," *The Transactions of the IEICE*, vol. E73, No. 7, pp. 1133–1146 (Jul. 1990).

Williams, "Internet Component Download," Microsoft Interactive Developer, 49–52, Summer, 1996.

Rozenblit, "O, A & M Capabilities for Switching Software Management," IEEE Global Telecommunications Conference, 1993, pp. 357–361.

Mercury Operator's Log: Oct. 26–Dec. 1, 1994, p. 1.*

* cited by examiner

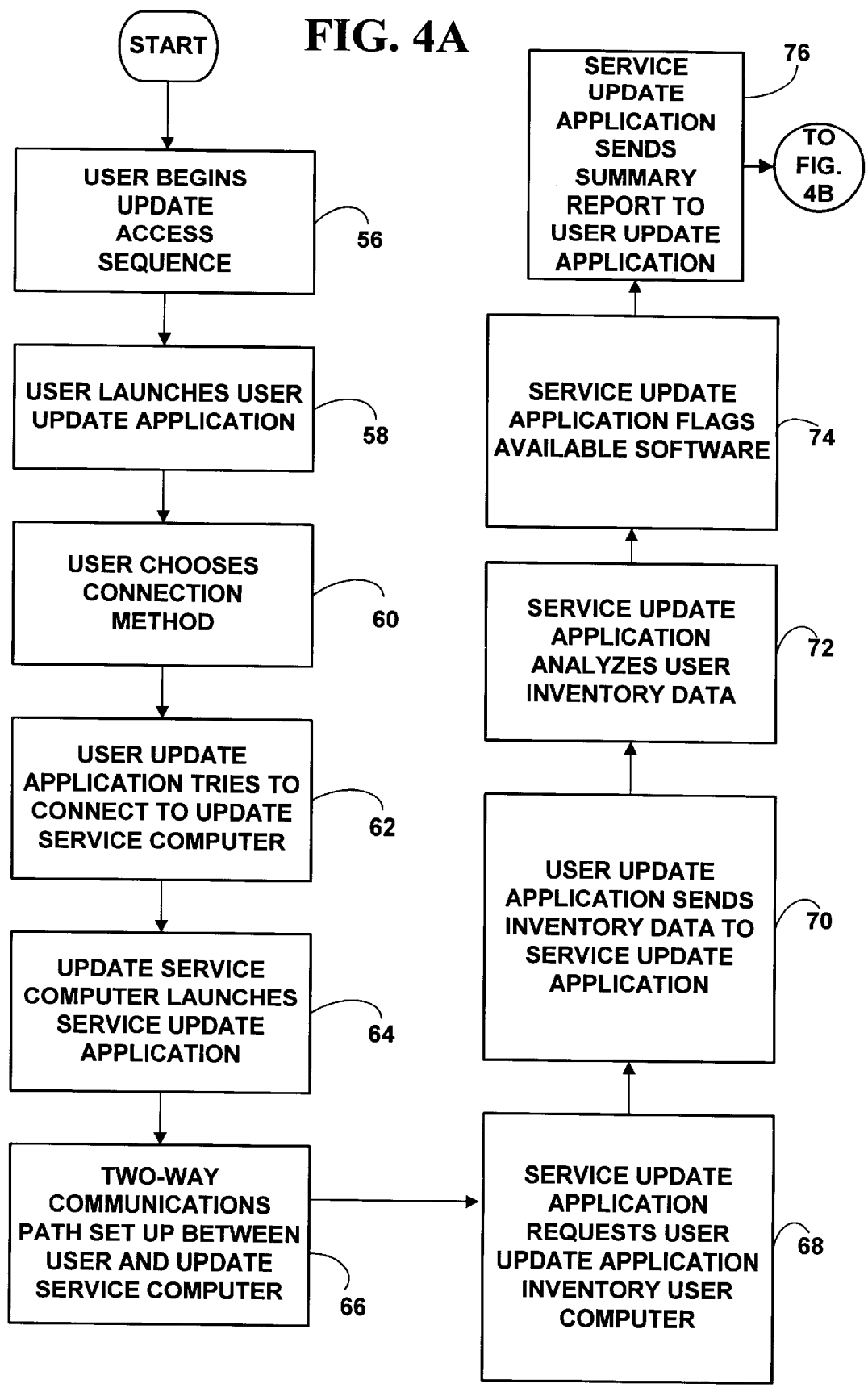

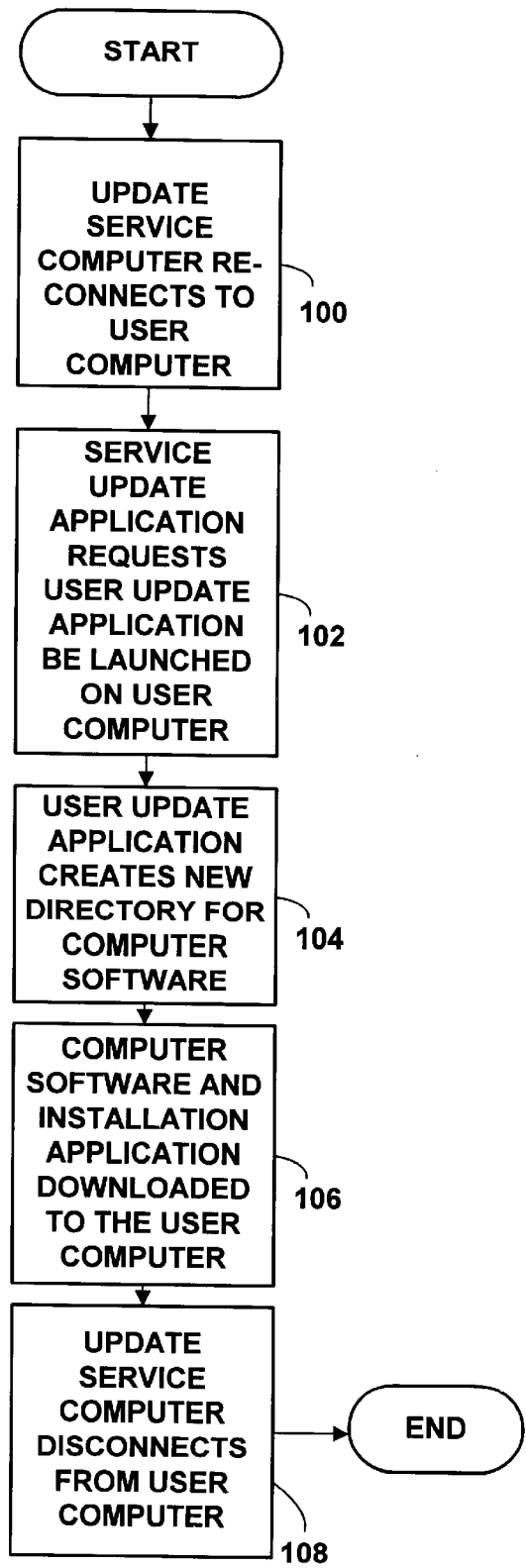

METHOD FOR IDENTIFYING AND OBTAINING COMPUTER SOFTWARE FROM A NETWORK COMPUTER USING A TAG

CROSS-REFERENCE TO RELATED APPLICATION

This is a divisional of U.S. patent application Ser. No. 08/634,390, entitled, "METHOD AND SYSTEM FOR IDENTIFYING AND OBTAINING COMPUTER SOFTWARE FROM A NETWORK COMPUTER," filed Apr. 18, 1996, now U.S. Pat. No. 6,049,671.

FIELD OF INVENTION

The present invention relates to a system for automatically identifying software that may be appropriate for installation on a computer and for making that software available to that computer. In particular, the invention relates to a tag in a hypertext document indicating software to be automatically downloaded to the computer.

BACKGROUND AND SUMMARY OF THE INVENTION

The continual and rapid development of computers, computer software and related technology has revealed many problems with the typical update and distribution channels for computer software. For example, computer software, the coded instructions that control a computer's operation, is constantly and incrementally being upgraded and improved. The computer hardware and operating system environment on which the computer software is used is continually being changed, which requires additional changes in the computer software (e.g. new device drivers, new operating system calls, etc.).

A computer software developer will typically release an initial version of a software product. Thereafter, as new and improved computers and peripherals are developed, the software product will commonly be upgraded to take full advantage of the increased capabilities of the hardware. In addition, a software developer, to remain competitive, will often upgrade the software product to provide new features and functionality.

With the ever increasing pace of advancement in computer related technologies, software developers compete to be the first to offer a new feature or upgrade. As a result, sometimes software products are made available to the public with unknown errors or defects. Similarly, software products that work as intended on a particular computer with a particular configuration, may fail when installed on a different computer having a different configuration (e.g. different hardware, peripherals, operating systems, etc.). Software developers frequently provide fixes for their software products to correct defects that were undetected or unanticipated at the time the software product was released. Fixes are also provided to allow the software product to function correctly on a new computer or with a different operating system environment.

However, it is often difficult for software developers to make upgrades and fixes available to users. This difficulty not only deprives the user of access to the most reliable and up-to-date software products, it can result in lost sales to the software developer and can damage the goodwill and the development of a long term relationship with a customer by releasing a flawed or deficient software product.

Commonly, mass distribution of commercial software products is accomplished by copying the software product onto storage media (e.g. CD-ROMs, floppy disks, magnetic tapes, etc.). To take advantage of economies of scale, typically a large number of copies of the software product are made during the manufacture of a particular software product. Then, the storage media containing the software product is provided to distributors and retailers for sale to users.

However, given the rapid pace of software development, this manner of distribution is frequently insufficient. For example, it is not uncommon that defects are detected and fixes created shortly after a software product is introduced to the public. However, the software products that remain in the distribution chain contain the defect without the fix. This situation is frustrating for users who subsequently purchase the software product that is already obsolete (i.e. because of the defects).

Software can also be distributed over electronic bulletin board systems, the Internet, etc. In such systems, a user connects to the bulletin board or the Internet and then selects and downloads desired software. Such systems allow for rapid updating of software by simply supplying a new updated version of the software to the bulletin board. However, such systems also require a degree of user sophistication and technical expertise in the selection, downloading and installation of the new software. Moreover, such systems do not provide a user that has already obtained a software product with a simple, automatic way of learning of or obtaining upgrades or fixes for that product. The software provider may also have updated help files and other help utilities about which a user would have no way of knowing.

The present invention overcomes many of the problems associated with obtaining computer software. A user with a user computer is allowed to access (e.g. with a modem, an Internet connection, etc.) an update service, a network service, etc. (e.g. the Internet) at a remote location on which is stored a variety of computer software. When a user accesses the remote update service or network service, an update service computer conducts an automatic inventory of the computer software on the user computer. The data collected from the inventory of the user computer software is then used to make comparisons to database entries from a database on the update service computer. The database entries contain information about computer software available on the update service computer. The comparison is conducted to identify software available from the remote update service that might be appropriate for installation on the user computer (i.e. new computer software, new versions of existing computer software, patches or fixes for existing computer software, new help files, etc.). After the comparison is completed, the update service computer makes the computer software stored at the remote update service computer available to the user.

In one aspect of the invention, available computer software can be downloaded from the remote update service computer and installed immediately on the user computer. Another aspect of the invention allows the update service computer to contact the user computer at a later, more convenient time, reestablish two-way communications, then download and install available computer software on the user computer. If a delayed download is requested, the user will provide access information (e.g. phone number, network address, a file of commands to execute to logon the user computer, etc.) to the update service computer which allows the remote update service computer to re-connect to the user computer. The transfer may use an encryption scheme to permit safe transfer of the software to the user computer.

In yet another aspect of the invention, the system will allow a user to purchase the available computer software electronically. The user, for example, provides credit card information, debit card information, an account number to bill, etc. to the update service computer. Secure transaction technology and/or digital signatures are used to safeguard the payment information. After verifying the payment information, the update service computer permits transfer of the computer software.

The electronic updates have several advantages. A user is automatically provided with information about the available versions of computer software as result of the inventory conducted by the update center computer. If the version of the computer software on the user computer has defects that are known and have been corrected, the user is alerted to this fact and is offered an up-to-date version of the computer software. The user is also alerted to the availability of new computer software, or enhanced versions of existing computer software, and can purchase them electronically. In either case, the most up-to-date versions of computer software are available for downloading to users.

The available versions of the computer software can also be automatically installed on the user computer. Since it is no longer necessary for the user to install the computer software, the incidence of user related installation problems is greatly reduced. It is also not necessary for the user to obtain or save any storage media since the computer software is downloaded directly to the user computer. If the computer software installed on the user computer ever gets corrupted, the user can call the update service (e.g. for some limited number of iterations) and download a new (and up-to-date) copy of the computer software.

In addition to providing benefits for the user, the present invention provides benefits to the developers of the software. The developers of the computer software save support, distribution, and advertising costs. A user who calls the update service or network service automatically obtains up-to-date versions of available computer software, and may never encounter defects which would have been encountered using an earlier, defective version of the computer software. As a result, a user will require less support from the developers of the software, be more satisfied, and be more willing to purchase future versions of computer software. Since the computer software is downloaded to the user computer, the developers of the computer software may save distribution costs as fewer versions of the computer software have to be copied to storage media and distributed. In addition, since the user is also alerted when new computer software, and/or new versions of existing computer software are available, the software developers may also save advertising costs.

The foregoing and other features and advantages of the present invention will be more readily apparent from the following detailed description, which proceeds with reference to the accompanying drawings.

BRIEF DESCRIPTION OF THE DRAWINGS

FIGS. 4A–4B are a flow chart illustrating an illustrative sequence which is followed when a user calls the update service.

FIG. 5 is a flow chart illustrating an illustrative sequence which is followed when the update service re-connects to a user computer.

DETAILED DESCRIPTION OF AN ILLUSTRATED EMBODIMENT

Figure 1:
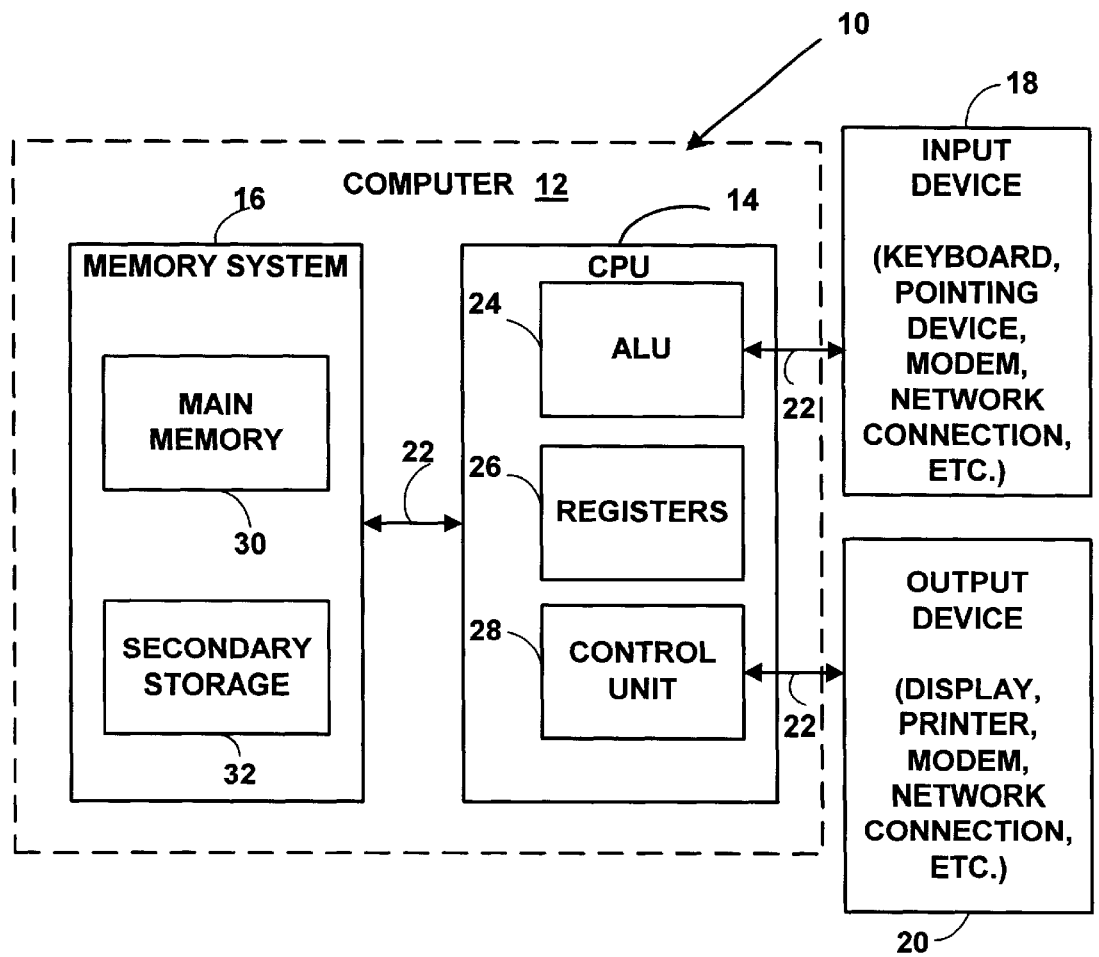
FIG. 1 is a block diagram of a computer system used to implement an illustrated embodiment of the present invention.

Referring to FIG. 1, an operating environment for the illustrated embodiment of the present invention is a computer system 10 with a computer 12 that comprises at least one high speed processing unit (CPU) 14, in conjunction with a memory system 16, an input device 18, and an output device 20. These elements are interconnected by a bus structure 22.

The illustrated CPU 14 is of familiar design and includes an ALU 24 for performing computations, a collection of registers 26 for temporary storage of data and instructions, and a control unit 28 for controlling operation of the system 10. Any of a variety of processors, including those from Digital Equipment, Sun, MIPS, IBM, Motorola, NEC, Intel, Cyrix, AMD, Nexgen and others are equally preferred for CPU 14. Although shown with one CPU 14, computer system 10 may alternatively include multiple processing units.

The memory system 16 includes main memory 30 and secondary storage 32. Illustrated main memory 30 is high speed random access memory (RAM) and read only memory (ROM). Main memory 30 can include any additional or alternative high speed memory device or memory circuitry. Secondary storage 32 takes the form of long term storage, such as ROM, optical or magnetic disks, organic memory or any other volatile or non-volatile mass storage system. Those skilled in the art will recognize that memory 16 can comprise a variety and/or combination of alternative components.

The input and output devices 18, 20 are also familiar. The input device 18 can comprise a keyboard, mouse, pointing device, sound device (e.g. a microphone, etc.), or any other device providing input to the computer system 10. The output device 20 can comprise a display, a printer, a sound device (e.g. a speaker, etc.), or other device providing output to the computer system 10. The input/output devices 18, 20 can also include network connections, modems, or other devices used for communications with other computer systems or devices.

As is familiar to those skilled in the art, the computer system 10 further includes an operating system and at least one application program. The operating system is a set of software which controls the computer system's operation and the allocation of resources. The application program is a set of software that performs a task desired by the user, making use of computer resources made available through the operating system. Both are resident in the illustrated memory system 16.

In accordance with the practices of persons skilled in the art of computer programming, the present invention is described below with reference to symbolic representations of operations that are performed by computer system 10, unless indicated otherwise. Such operations are sometimes referred to as being computer-executed. It will be appreciated that the operations which are symbolically represented include the manipulation by CPU 14 of electrical signals representing data bits and the maintenance of data bits at memory locations in memory system 16, as well as other processing of signals. The memory locations where data bits are maintained are physical locations that have particular electrical, magnetic, optical, or organic properties corresponding to the data bits.

Figure 2:
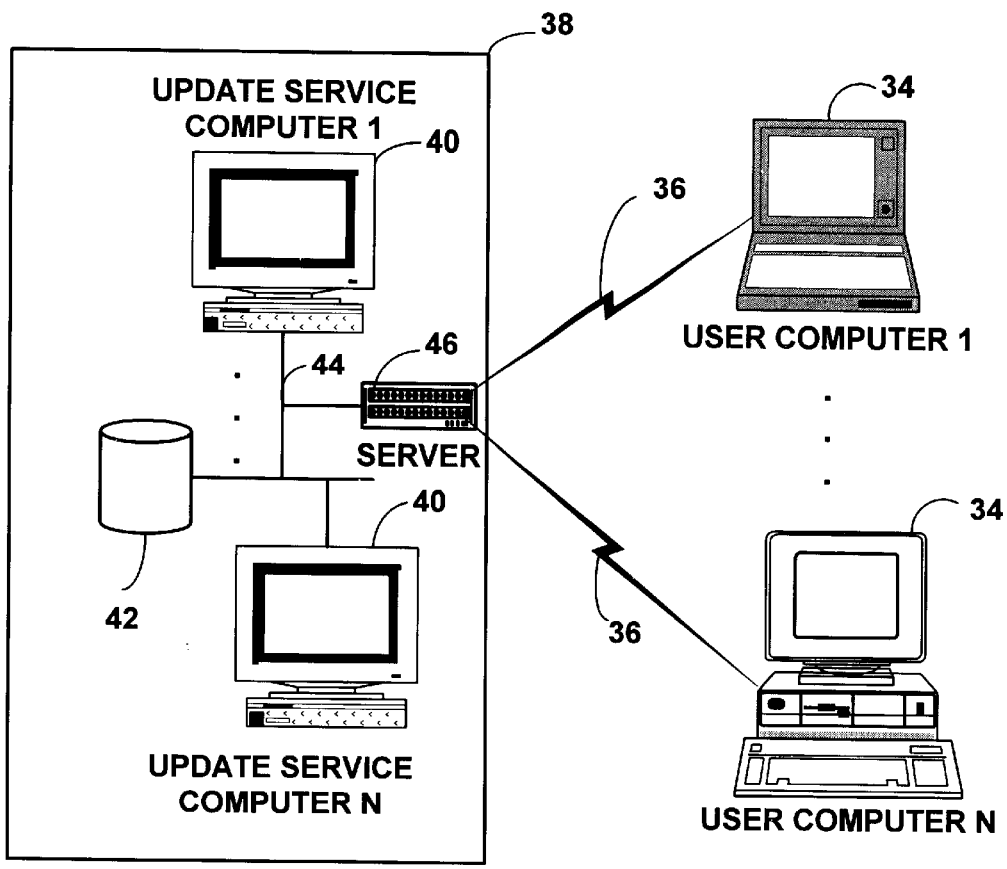
FIG. 2 is a block diagram illustrating the update service center and the remote user computers.

As is shown in FIG. 2, one illustrated embodiment of the invention consists of one or more user computers 34 which are connected over communications links 36 to an update service center 38. The update service center consists of one or more second remote computer(s) 40, one or more communications links 36, and one or more databases 42.

Figure 6:
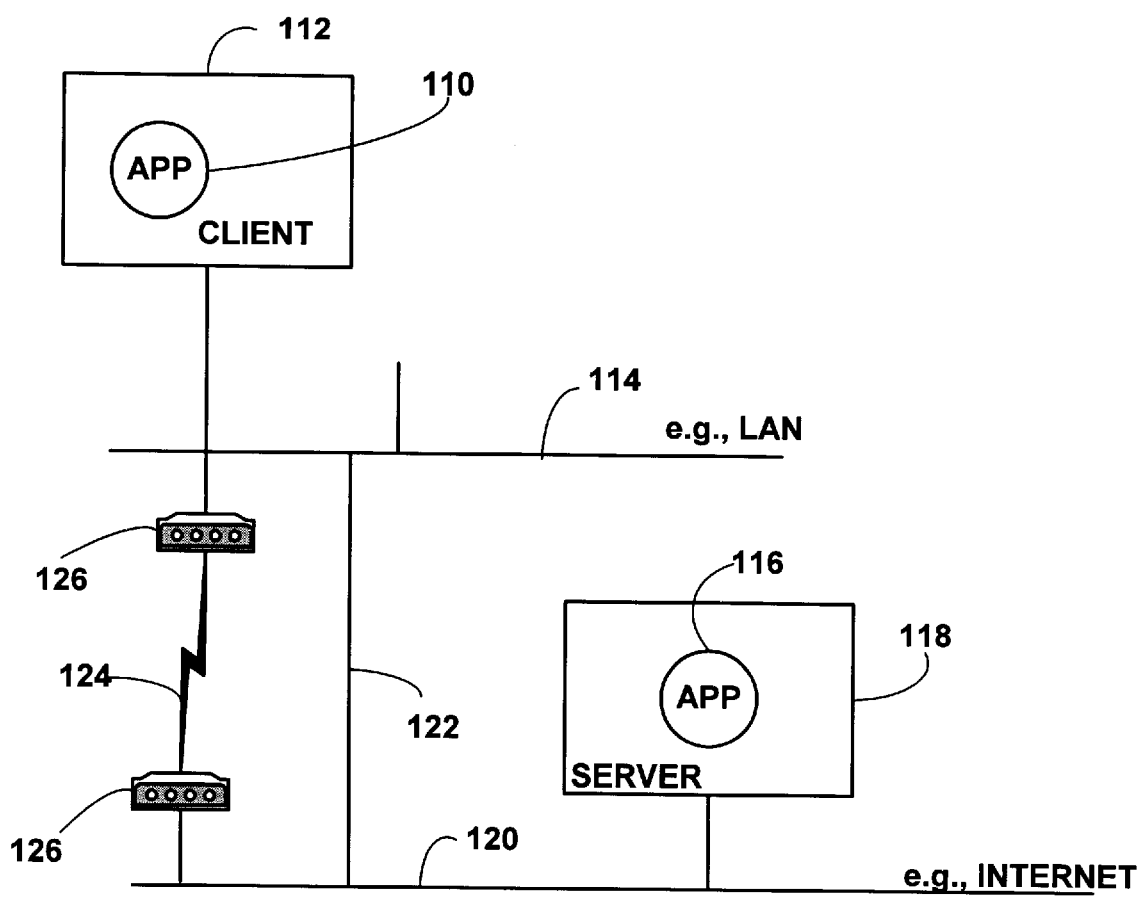
FIG. 6 is a block diagram illustrating the present invention on a computer network.

The update service center 38 consists of one or more computers 40 (e.g., the computer that was described in FIG. 1) which are capable of simultaneous access by a plurality of user computers. If a plurality of update service computers are used, then the update service computers may be connected by a local area network (LAN) 44 or any other similar connection technology. However, it is also possible for an update service center to have other configurations, one of which is shown in FIG. 6 and will be explained below. For example, an update service center could have a smaller number of larger computers (i.e. a few mainframe, mini, etc. computers) with a number of internal programs or processes running on the larger computers capable of establishing communications links to the user computers. The update service center may also be connected to a remote network (e.g. the Internet shown in FIG. 6) or a remote site (e.g. a satellite) (which is not shown in FIG. 2). The remote network or remote site allows the update service center to provide a wider variety of computer software than could be stored at the update service center. One or more databases 42 connected to the update center computer(s) 40 are used to store database entries consisting of computer software available on the update service computer(s). The update service computer(s) also contain a plurality of communications links 36 such as telecommunications connections (e.g. modem connections, ISDN connections, ATM connections, frame relay connections, etc.), network connections (e.g. Internet, etc.), satellite connections (e.g. Digital Satellite Services, etc.), wireless connections, two-way paging connections, etc., to allow one or more user computers to simultaneously connect to the update service computer(s). The connections are managed by an update server 46.

After a user computer establishes two-way communications with the update service computer, an inventory of computer software on the user computer is completed without interaction from the user, sent to the update service computer, and compared to database entries on the update service computer. The database entries from the database connected to the update service computer contain information about computer software which is available to a user. After the comparison, the user computer is sent back a summary of available computer software which is displayed for the user. The summary contains information such as the availability of patches and fixes for existing computer software, new versions of existing computer software, and brand new computer software, new help files, etc. The user is then able to make one or more choices from the summary of available computer software, and have the computer software transferred from the update service computer to the user computer. The user may choose to update on the fly, or store update information for future update needs.

Figure 3:
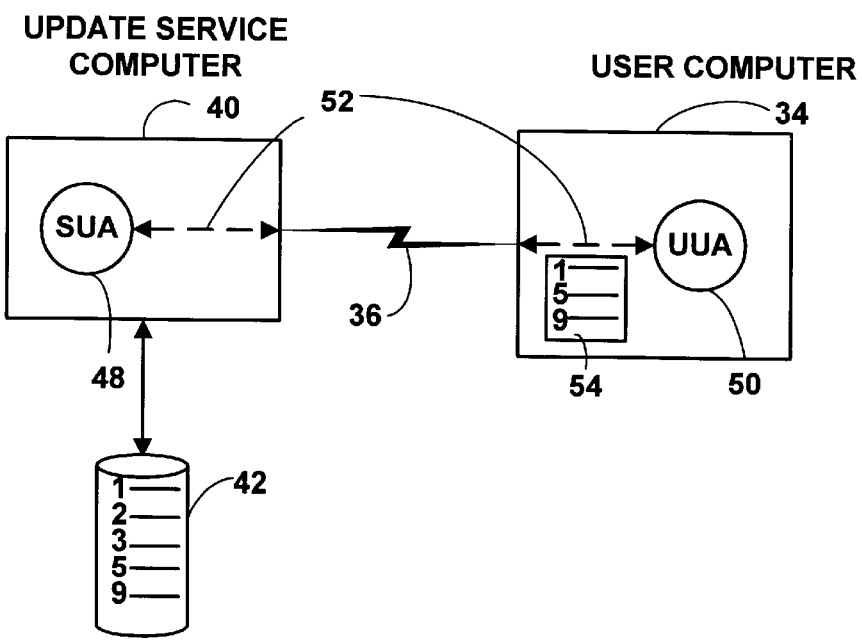
FIG. 3 is a block diagram illustrating the access processes on the user and update service computers.

As is shown in FIG. 3, running on the update service computer(s) 40 is one or more service update applications (SUA) 48 that will communicate with a user update application (UUA) 50 on the user computer when the update service is contacted by the a user with a user computer. The user update application 50 is a computer software program that is capable of initiating, establishing and terminating two-way communications with an update service application on the update service computer. The service update application 48 is a computer software program which is also capable of initiating, establishing and terminating two-way communications with a user update application on a user computer.

To access the update service center 38, a user starts a user update application (UUA) 50 on the user computer 34 to begin the access process. The user update application 50 tries to establish a two-way communications link 36 with an update service computer 40 using a modem, a network connection (e.g. Internet), etc. However, this access can also be completed by a variety of other methods which provide two-way data transfer. As the user update application 48 on the user computer 34 tries to establish a two-way communications link 36 to the update service computer 40, the update service computer starts a service update application (SUA) 48. The service update application on the update service computer then tries to establish a two-way communications link to the user update application on the user computer. This is shown by the dashed lines 52 in FIG. 3. This communications link can be established with a network protocol suite (e.g., TCP/IP) through sockets, or any other two-way communications technique known in the art.

After establishing a two-way communications link, the service update application conducts an automatic inventory (i.e., without input from the user) of the computer software on the user computer. The data collected during the inventory is sent from the user computer to the remote update service computer. The service update application on the update service computer compares the inventory data collected from the user computer to data stored in a database on the update service computer. The database contains information on available computer software available from the update service. The update service computer then creates a summary and sends the summary to the user computer. The summary 54 is then presented to the user by the user computer. The summary contains information about computer software available on the update service computer such as the availability of patches and fixes for existing computer software, new versions of existing computer software, and brand new computer software, etc. In addition, the availability of agent help files, wizards, inference engines, and other operating system components will be listed in the summary.

The illustrated embodiment of the invention is implemented in the Microsoft Windows 95 operating system by the Microsoft Corporation of Redmond, Wash. using a modem, or a Internet network connection, for access to the update service computer. The invention can likewise be practiced with other operating systems and other access technologies that allow two-way data transfer.

Figure 4B:
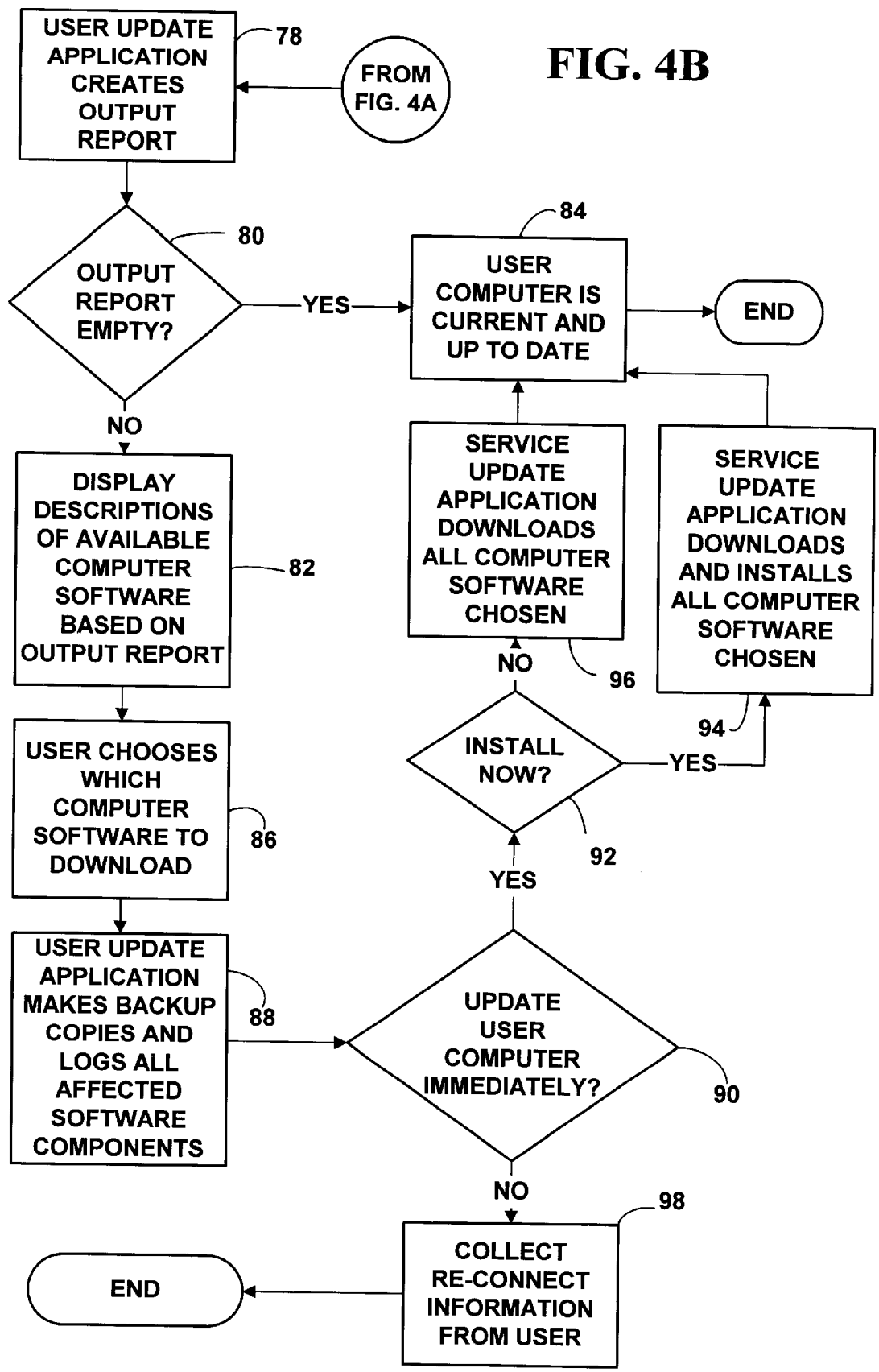

As is shown in the flowchart in FIG. 4A, a user begins the access sequence 56 to an update service by launching a user update application included in the Windows 95 operating system. However, the user update application can also be any application that is capable of two-way communications, and run under other operating systems. The user update application allows the user computer to establish a two-way communications path for access to the update service computer.

When the user update application starts 58, the user is shown optional help information which instructs the user on how to establish a connection between the user computer and the update service computer. The actual connection configuration is completed by allowing a user to choose the appropriate connection method 60. For example, the user may choose to establish the connection with a modem. If a modem is chosen, the phone number to dial, modem (e.g. speed, line type, etc.) and communications parameters (e.g. parity, stop bits, etc.) are then configured. If the user chooses to make a network connection (e.g. Internet, etc.) to access the update service, the network address of the update service and other network parameters are configured. A similar sequence would be completed for other connection technologies.

When the user update application attempts to make the desired connection 62, the update service computer launches a service update application 64. A two-way communications path 66 is set up between the service update application on the update service computer and the user update application on the user computer. The service update application on the update service computer then requests that the user update application on the user computer conduct an automatic inventory of all computer software installed 68 on the user computer.

In the illustrated system, this inventory is done automatically (i.e., without input from the user), and is completed by assigning the inventory task to a Window's 95 operating system process thread on the user computer. The operating system thread completes the task in the "background" while the user is performing other activities in the "foreground" (e.g., choosing options from the user update application). Background and foreground processes refer to a number of operation system processes and process threads which are run for some specified time interval by the operating system. Threads are well known in the art and are used in other operating systems such as Windows NT by Microsoft, and OS/2 by IBM. However, other operating system techniques could also be used to accomplish the inventory on the user computer.

During the inventory, data is collected about all computer software installed on the user computer. Data such as the software title, date, version, file size, file checksum, directory location on the user computer, etc. are collected. After the inventory is complete, the user update application sends 70 the inventory data from the user computer to the service update application on the update service computer. The service update application compares the user inventory data from the user computer to database entries in the computer software database to automatically analyze the computer software stored on the user computer 72. The database connected to the update service computer has entries which contain information about available computer software. The database entries also identify and describe, for example, components of the computer software, including new computer software, patches, fixes, new help files, wizards, inference engines, other operating system components, updates as well as enhancements and new features of existing computer software. The database entries describing new computer software may also include entries describing brand new computer software (i.e. computer software that is newly created, and not previously existing).

Any computer software installed on the user computer which is listed in the database on the update service computer (e.g. out-of-date and/or requires a maintenance update, etc.) is flagged as available 74. The user computer may also contain computer software that is not known by the update service. If the user computer contains computer software which is unknown to the update service computer, this computer software is marked as unknown by the update service computer. After the service update application completes the analysis of user computer software, a summary report is sent back to the user computer from the update service computer 76.

In the illustrated system, the user can choose from several update service options. One option may be to check for maintenance updates for all computer software installed on the user computer that is known by the update service. A second option may be to check only specific computer software, or a specific group of computer software stored on the user computer for maintenance updates. For example, if the user wanted to check and see if there were any maintenance updates for a particular word processing program, option two would be selected. A third option may be to check whether there are any new or enhanced versions of computer software available from the update service. A fourth option may be to check only for new versions of specific computer software or groupings of computer software installed on the user computer. A fifth option may be to check the update service computer for information on new computer software (i.e. brand new products, not new or enhanced versions of existing products). A sixth option may be to check only if there are new help files, or other new support data available. This list of options is not intended to be all inclusive, as other options can be added to provide additional update service functionality. Based on user input, the user update application creates an output report 78 (FIG. 4B) based on the option(s) chosen by the user and the summary report created by the service update application. The service update application can also create the output report directly, using default choices with no input at all from a user.

If the output report is not empty 80, a second optional report is created and displayed for the user providing a short description that summarizes the computer software available from the update service 82. This second optional report is used by the user to determine what computer software on the user computer will be updated, if any. If the output report is empty, the computer software on the user computer is current and up-to-date 84, so no further action by either the update service computer or the user computer is required.

If the output report is not empty, then the user is asked to choose which available computer software shown in the output report, if any, will be downloaded and installed on the user computer 86. No software is downloaded without the user's permission. If one or more computer software components (i.e. pieces or parts of the available computer software) are chosen by the user, the user update application is instructed to make backup copies of all of the computer software components on the user computer that will be affected, and create a log for the user documenting which computer software will be replaced 88. The backup copies and the log can be used by the user to restore the original version of the computer software components on the user computer if a need arises to do so.

The user has the option of choosing none, one, or a number of computer software components to download and install. If the list of available computer software to be downloaded and installed is large, the user also has the option of delaying the update to a later time 90. If the user chooses an immediate download, the user is asked if the service update center should also install the computer software chosen by the user 92 after downloading.

If immediate installation is chosen, the service update application on the update service computer downloads the available software to the user computer and installs the software in the proper place (e.g., in the proper directory or subdirectory) on the user computer 94. A log is also created that records what computer software was downloaded to the user computer. If immediate installation is not chosen by the user, the user can save any update information, and continue with other tasks before deciding when to download any software chosen by the user.

If the user chooses a delayed update, the user provides re-connect information 98 that allows the update service computer to re-connect to the user computer at a more convenient time (e.g. midnight, etc.) and complete the downloading and installation at that time.

As part of the re-connect information, the user may create a logon script using an automated macro language to provide the logon sequence to be used, and the directory to be used to download the software chosen by the user. The logon script and the time the user wishes to have the chosen software downloaded are then sent to the update service computer, and stored in an update service computer database. At the appropriate time chosen by the user, the update service will execute the logon script to re-connect to the user computer, and download the chosen software in the proper directory. An encryption scheme may also be used to permit safe transfer of the software to the user computer.

The user also has the option of choosing a logon method different than the one they are currently connected to the update service center with. For example, if a user is connected to the update service center with a modem, the user may choose to have the chosen software downloaded at a later time using a network connection (e.g., Internet, etc.) However, the user's computer must be capable of accepting software with a different connection method.

To allow a re-connection using a modem, the user would enter the phone number of the phone line attached to the user computer and send this information to the update service computer. The user would leave the user computer and modem on, and set the communications software in an answer mode to answer any incoming calls. For a network re-connection, the user would provide the update service computer the user network address and set the network software in a host mode to process any network connection attempts.

The delayed downloading is illustrated in the flow chart in FIG. 5. To complete the delayed downloading, the update service computer launches a service update application that tries to re-connect 100 to the user computer. The update service application will use the information provided at an earlier time by a user (e.g. modem logon information, network logon information, a logon script, etc.). If the connection is successful, a service update application on the update service computer asks the user computer to launch a user update application to re-establish a two-way communications path 102. The re-connect to the user computer may be completed using a different access method than was used during the original user computer-update service computer connection. For example, the update service computer may request a digital satellite system re-connect to the user computer instead of the update service computer. A different access method is typically chosen to provide the most efficient and greatest bandwidth data transfer between the update service computer and the user computer.

After establishing a new two-way communications path, the user update application creates a new directory 104 on the user computer, where the computer software is transferred and stored 106. A log is also created to document what available computer software was transferred to the user computer. Included with the downloaded computer software is an installation application that will be used later by the user to install the computer software. When the transfers are complete, the update service computer terminates the connection to the user computer 108. An encryption scheme may also be used to permit safe automated transfer of the software to the user computer.

When the user is ready to install the computer software (e.g. the next morning if the computer software was transferred and installed in the middle of the night), the user simply launches the installation application supplied by update service computer.

Leaving the user an installation application to execute is an added safety and security measure for both the user and the update service. The user computer is not updated unless the user personally starts the installation process. However, the user can also choose to have the computer software automatically installed by the update service when it re-connects to the user computer (but, user permission is always obtained and recorded first). In this case, the installation application is not downloaded to the user computer. However a log is created so a user can determine what available computer software was downloaded and installed.

As was described above, the third, fourth, and fifth options allow a user to check for new versions of existing computer software, or new computer software available from the update service. If a new version of existing computer software, or new computer software is available, the user is asked if they wish to purchase the computer software. If so, the appropriate fee is requested from the user. The user can pay the fee electronically by transmitting credit card information, debit card information, billing account information, etc. to the update service computer from the user computer. Digital signatures, secure transaction technology, or an encryption scheme may also be used to collect payment information from the user. Once the fee information is collected by the update service computer and is verified, the user can choose between immediate or delayed downloading of the new, or new version of the computer software following steps (88–98) (FIG. 4B) described above.

Since new versions of computer software are typically very large, the user will be informed that a delayed installation is probably most efficient for the user. If a delayed installation of a new product is chosen, the update service computer will then re-connect to the user computer at a later time and download the new version of the computer software as was shown in FIG. 5. In the illustrated embodiment, the update service uses a digital satellite service link, or some other higher bandwidth connection to transfer the computer software to the user computer whenever possible.

If the user chooses not to pay for a new version of computer software when the update service is called, additional data from which the user can obtain more information on the new computer software is displayed. For example, the information may contain a summary of the features of the new computer software and the information may also contain a list of retail outlets close to the user where the user may then purchase a new version of computer software on storage media if desired. Some users may prefer to obtain the computer software on storage media and call the update service to obtain up-to-date versions of the computer software.

In another embodiment of the present invention, software updates are determined for network-related software for computer networks like the Internet. The Internet is a world-wide network of cooperating computer networks. Connected to the Internet are thousands of individual computers each with a variety of application programs.

From a user's point of view, access to the Internet and its services typically are accomplished by invoking network application programs (e.g., Internet browsers). The network application programs act as an interface between a user and the Internet. The application programs are typically "client" applications that accept commands from the user and obtain Internet information and services by sending requests to "server" applications on another computer at some other location on the Internet.

There are many network browsers known in the art such as the Internet Explorer by Microsoft Corporation of Redmond, Wash., Netscape Navigator by Netscape Communications of Mountain View, Calif., and Mosaic by the National Center for Supercomputer Applications (NCSA) of Champaign-Urbana, Ill.

These network browsers send network requests via the File Transfer Protocol (FTP), Simple Mail Transfer Protocol (SMTP), Hyper Text Transfer Protocol (HTTP), Gopher, etc. which are used to exchange data with a computer network like the Internet. FTP is used to move files from one computer to another. FTP operates independently of where the computers are located, how they are connected, or even whether they are using the same operating system. Provided both computers can "talk" FTP and have access to a mutually common network, FTP can be used to transfer files.

Gopher allows an application to browse Internet resources using menus. The Gopher menus allow browsing of Internet resources regardless of their type. A Gopher user need not specify formal Internet details (e.g., domain names, IP addresses, etc.) to find desired information.

HTTP is a protocol used to access data on the World Wide Web. The World Wide Web is an information service on the Internet containing documents created in the Hyper Text Markup Language (HTML). HTML allows "links" to other documents, which may found on other Internet host computers. The HTML document links may use HTTP, FTP, Gopher, or other Internet application protocols, to retrieve the remote data pointed to by the link.

As is shown in FIG. 6, which is an integrated illustration of alternative conventional ways in which a client computer may communicate with a network, a client networking application program (e.g., an network browser) 110 residing on a client computer 112 which is a stand alone computer or is a computer connected to a local area network (LAN) 114. Client networking application program 110 communicates with (e.g., makes a data request of) a server application 116 on a remote server computer 118 connected to a remote computer network (e.g., the Internet) 120. The communications can be a direct connection 122, or the communications 124 can be achieved using a pair of modems 126 or some other telecommunications device (e.g., an ISDN device) (not shown in FIG. 6). Hereinafter the client networking application program 110 will be referred to as a "network browser".

In the rapidly changing Internet environment, network browsers are continually enhanced to provide new and additional features. As a result, when a user contacts a network browser service (e.g., the Internet or a World Wide Web site operated by the network browser developer or a service provider operating on behalf of the developer), a user's network browser can be checked, and the user alerted to the availability of a new or enhanced version of the network browser. This invention is described with reference to features and utilities included in the Windows 95 operating system of Microsoft Corporation. It will be appreciated, however, that these features and the functions of the utilities could be performed by other operating systems or applications.

In a preferred embodiment of the present invention, information about a network browser is stored at a client computer in an operating system registry. The operating system registry, as is known in the art, is a hierarchical database of keys and values that stores information describing a computer system's hardware, user preferences, available application programs, and other configuration data. A preferred embodiment of the present invention uses the Windows 95 operating system registry to store information about the available network browsers and other available software. However, other registering techniques and other operating systems can also be used.

For example, the Windows 95 operating system registry may contain the following entry:

SW/
  MSIE
  TS=04/15/96 12:32:33
  VER=2.0 where "/SW" is a software entry in the registry, "MSIE" is the name of the network browser,(e.g., Microsoft Internet Explorer), "TS" is the time stamp signifying when this version of the network browser was installed on the client computer 112, (e.g., Apr. 15, 1996 at 12:32:33 pm) and "VER" is the VERsion of the network browser (e.g., 2.0). However, other operating system registry formats could also be used.

When the user contacts a network service with a network browser, the server application 116 (with functionality similar to the service update application 48 of FIG. 3) determines the type of network browser being used, and then reads the operating system registry on the client computer 112 to determine the installation date and version of the network browser being used as was described above and illustrated in FIGS. 4A–4B.

If a new or enhanced version of the network browser is available, the user is asked whether he wishes to download it from the server computer 118 to the client computer 112. If the user answers in the affirmative, the new or enhanced version of the network browser is downloaded to the user client computer 112 by the remote server application 116 on the server computer 118 over the computer network 120. The same method is used for other network-related software and for other non-networking software as was discussed above. The user can also choose a delayed request as was described above.

In addition, an HTML document requested by the user can contain an HTML reference to request a specific version of a network browser or some other application software. The HTML reference preferably appears as a conventional HTML reference or link that is included; for example, in a description of the specific version of the network browser. For example, a reference to a network browser in an HTML document may be:

<FETCH TS="04/15/96" DESC="Microsoft Internet Explorer Ver. 2.0" SRC="http://www.microsoft.com/ie/MSIE20.exe"> where FETCH indicates an HTML software download command,
TS="04/15/96" is the Time Stamp for the requested software, DESC="Microsoft Internet Explorer Ver. 2.0" is a text DESCription of the requested software, and SRC=

"http://www.microsoft.com/ie/MSIE20.exe" is the Internet (or intranet or other network) location of the requested software. This type of HTML reference can also be used to receive software viewers, or other software applications that are used within HTML documents.

In a preferred embodiment of the present invention, if the user desires to obtain a new or enhanced version of software (e.g., the network browser) or an HTML FETCH reference is made, the software is sent using a Secure Software Distribution (SSD) process. However, a non-secure software distribution process could also be used. The Secure Software Distribution process uses a collection of software applications that enable a server application 116 to distribute software to users in a high-quality, reliable, and secure manner.

Distributing software over public channels like the Internet (or public intranet channels) exposes the software to accidental or intentional corruption or attack (e.g., viruses, trojan horses, etc.). By using a SSD process, new versions of software (e.g., a new network browser requested by an HTML Fetch request) can be verified as being secure by the server application 116, sent across a public network channel (e.g., the Internet), and then verified again by the client application 110. A SSD process is available as an option from a network browser (e.g., the Microsoft Internet Explorer) and is described below in greater detail.

Figure 7:
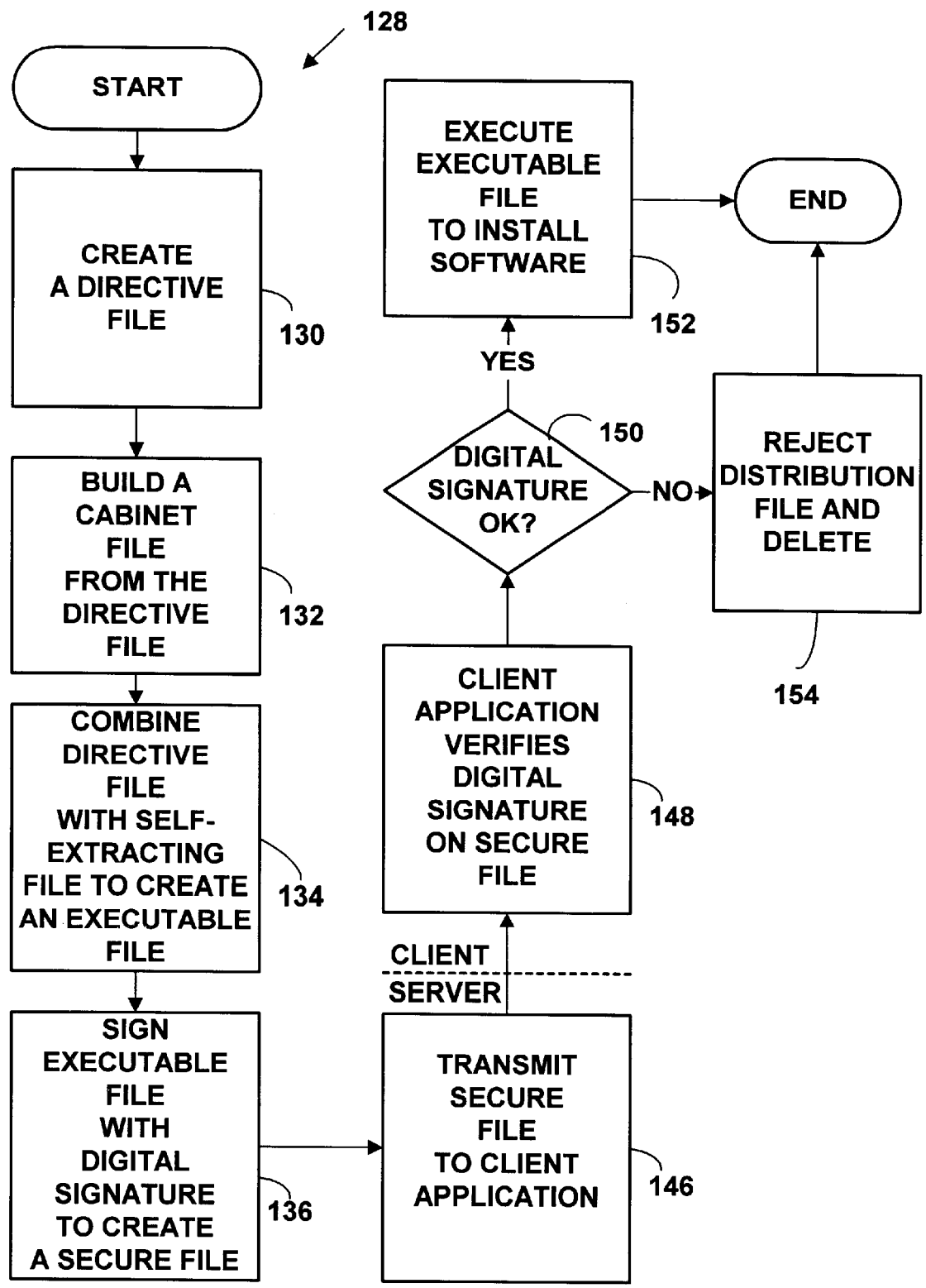
FIG. 7 is a flow diagram illustrating a method of obtaining software over a computer network for the present invention.

In a preferred embodiment of the present invention, SSD is used to distribute a self-extracting archive of files to a client application 110. The self-extracting archive of files will contain a new or enhanced version of a network browser software received by an HTML FETCH command or other software request. When this archive is executed, it extracts all of the included files, and then executes one of those files (e.g., setup.exe) to complete the installation automatically (i.e. without further user input). The flowchart in FIG. 7 shows a method 128 of creating a secure, self-extracting archive of files using an SSD process.

When a user makes a request, either explicitly or by a HTML Fetch reference, for software (e.g., a new or enhanced version of a network browser or other software), the server application 116 on the server computer 118 creates a file of directive commands 130. The file of directive commands is typically stored in a Media Directive File (*.MDF) format. However, other file formats could also be used. The file of directive commands or directive file is used to create a Cabinet file and to designate an installation program to run to install the requested software. A cabinet file (*.CAB) is a grouping of files that are commonly conceptualized as being stored in an "electronic filing cabinet." Cabinet files are known to those in the art. For example, to create the cabinet file, the directive file may contain the following directives:

.Set Cabinet=on
.Set Compression=on
bin\msie20.exe
bin\msie20.hlp
bin\msie20.dll
. . .

where the directive ".Set Cabinet=on" is used to indicate creation of a cabinet file, and the directive ".Set Compression=on" is used to indicate the files in the cabinet file are to be compressed. In a preferred embodiment of the present invention, the compression scheme used is a loseless data compression scheme called "LZ77," which is a variety of the lossless Lempel and Ziv compression scheme known in the art. However, other compression schemes can also be used. Compressing files in the self-extracting archive makes the self-extracting archive smaller in size and thus, easier to transmit to a client application.

As an example, the file "bin\MSIE20.exe" is an executable (*.EXE) version of the Microsoft Internet Explorer version 2.0 from the "bin\" directory, the file "MSIE20.hlp" is a help file for the Internet Explorer version 2.0, and the file "MSIE20.dll" is a Dynamic Link Library for the Internet Explorer version 2.0. Dynamic Link Library (DLL) files provide reentrant function libraries that applications link to and call as regular function calls. DLLs are known and understood by those skilled in the art. More or fewer directives files, and types of files, could also be used for the cabinet file.

A set of directives in the directive file is also used to mark an installation program to install the software contained in the cabinet file. In a preferred embodiment of the present invention, the directive file may include a switch that can be set to run the installation program automatically (i.e., without further user input). For example, the following lines may be included in the directive file for an installation program:

.Set Cabinet=off
.Set Compress=off
.Set InfAtt=off
bin\setup.exe
bin\setup.inf
. . .

where the directive ".Set Cabinet=off" is used leave the installation program outside a cabinet file. the directive ".Set Compression=off" is used to suppress compression of the installation program, and the directive ".Set InfAtt=off" sets the read file attributes for the installation program. (e.g., turns off read-only mode, etc.). In this example, the "bin\setup.exe" file is the chosen installation program, and the "bin\setup.inf" is an information file (*.INF) for the installation program. Both setup files are from the "\bin" directory. More or fewer directives and files could also be used for the installation program. In an alternative embodiment of the present invention, the installation program could also be compressed and placed in a cabinet file.

Other directives (e.g., file directives) are also typically added to the directive file. For example, the following lines may be included in the directive file:

Set CabinetNameTemplate=IE20.*
Set DiskDirectoryTemplate=IE20*
. . .

where the directive ".Set CabinetNameTemplate=IE20.*" sets the cabinet name template (e.g., IE20.exe, IE20.dll), and the directive ".Set DiskDirectoryTemplate=IE20*" sets the disk directory template (e.g., \IE20). More or fewer directives could also be included. An exemplary layout of a directive file is shown below.

;Example cabinet file
. . .
;file directives
.Set CabinetNameTemplate=IE20.*
.Set DiskDirectoryTemplate=IE20*
. . .
;Installation program
.Set Cabinet=off
.Set Compress=off
.Set InfAtt=off bins\setup.exe
bin\setup.inf
. . .
;cabinet file
.Set Cabinet=off
.Set Compress=off
.Set InfAtt=off
bin\setup.exe
. . .
bin\setup.inf
;*** <end> where the lines beginning with semi-colons ";" represent comments in the directive file. File directives are typically placed at the top of the directive file, then the cabinet file information and related directives, and then the installation file information and related directives. However, other directive file layouts could also be used.

The cabinet file just described is created with a disk layout and compression application called Diamond by Microsoft. However, other tools could also be used to build the cabinet file. To create a cabinet file from the exemplary directive file shown above, the server application 116 issues the following command:

diamond/ffile.ddf to build a cabinet file (*.CAB) from the directive file 132. Directive files used with the Diamond disk layout and compression tool are typically designated as Diamond Disk Format (*.DDF) files instead of Media Directive File (*.MDF) as was described earlier. DDF format is similar to MDF format, but differs by providing the ability to create self-extracting, executable, secure distribution files containing software. However, other format designations could also be used. The Diamond Disk Compression and Layout application is summarized below.

diamond/source_file [destination_file][/RUN][/INF=YES|NO]

Switches:
/f source_file Is the name of the source directive file(e.g.,*.DDF) and may include a relative or absolute path specification.
[/RUN] Is an optional switch to automatically run the installation program after extraction.
[/INF=YES|NO] Is an optional switch to include an information file with the installation program and has the values of YES or NO.

Parameters:
[destination_file] Is an optional parameter to store a name in the cabinet file, if ".Set Cabinet=on," or the name of the destination file if ".Set Cabinet=off."

After it is created, the cabinet file is combined with a self-extracting application program 134 called "WEXTRACT.EXE" to create a self-extracting executable archive file (e.g., dist.exe). This combination is the self-extracting archive of software, and hereinafter will be referred to as a self-extracting executable distribution file. The combining of the cabinet file and WEXTRACT IProgram is performed by a Windows 95 utility application program called "COMBINE.EXE." However, other self-extracting and combination application programs could also be used.

The COMBINE application program combines the cabinet file with the WEXTRACT program to create a self-extracting, executable distribution file. The cabinet file is attached to the WEXTRACT program as a user defined resource called "CABINET." User defined resources are known to those skilled in the art. The COMBINE application computes an installation table of how many disk clusters will be needed to extract and store the files included in the cabinet file for each cluster size that is designated by file directives in the *.DDF or *.MDF directive files. The installation table is placed in the executable distribution file (e.g., dist.exe) for use by the WEXTRACT program at extraction time. In addition, the server application may specify an additional amount of user space that is required during the installation process. The user space is specified by a user from the network browser when the desired software is selected. This user specified space is also stored in the installation table. The WEXTRACT program uses the information in the installation table to prevent extraction until enough free space is available on client computer 112 to complete the installation. If enough free space is not available, the user is asked to delete existing files to free up space before the installation takes place.

COMBINE also allows other information such as graphical images and text to be added to the self-extracting executable distribution file. This information is typically shown while the self-extractor is running and allows customization of the installation application. The information may include a summary of features in the application program included in the distribution file, customization options selectable by the user, and reminders regarding registration and other protection for the program. Customization of the installation application increases visual appeal for the user. In addition, the cabinet file added to the self-extracting distribution file can be a cabinet file in a linked set of cabinet files. The WEXTRACT application will follow any cabinet links to subsequent cabinets. This allows distribution of large software packages in smaller pieces (e.g., by disk sizing) while still having a single executable distribution file that is relatively simple in format. The COMBINE application is summarized below.

combine [/S extrasize] extractor cabinet_file destination

Switches:
[/S extrasize] Set the number of extra 32 k clusters that this application will need for installation. If no /S parameter is provided it will default to zero. This parameter can be retrieved later by (MSSFVerify( )) and passed to the self-extractor (e.g., WEXTRACT) to prevent it from running until enough disk space is available.

Parameters:
extractor The name of the extractor with which the cabinet file will be attached (e.g., WEXTRACT).
cabinet_file The name of cabinet file to be made self-extracting (e.g., file.CAB).
destination The name of the resulting self-extracting executable distribution file (e.g., dist.exe).

The WEXTRACT program is preferably a Windows 95 based application for extracting cabinet files. WEXTRACT will extract the cabinet file that is attached to the WEXTRACT executable by the COMBINE application. However, other extraction programs could also be used. Any disk space information that was added to the installation table is included in the self-extracting executable distribution file by the COMBINE program will be used to prevent the extraction and installation from running until the client computer 112 disk space needs are met. Any text descriptions or graphics images that were added to make the installation interface more user friendly and informative will also be extracted by WEXTRACT. The WEXTRACT application is summarized below.

wextract [cabinet_file]

Parameters:
cabinet_file An optional parameter for the cabinet file to extract. If no cabinet_file is specified, then the WEXTRACT application attempts to retrieve the cabinet from itself as a user-defined resources called "CABINET". (see COMBINE above).

After the cabinet file is combined with WEXTRACT, the resulting self-extracting, executable distribution file (e.g., dist.exe) is digitally signed with a digital signature to create a signed, self-extracting executable distribution file 136. The executable distribution file with the digital signature is now a SECure (*.SEC) executable distribution file. The digital signature is preferably added with a Windows 95 utility application program called "SIGNMS.EXE". However, other digital signature application programs can also be used.

The SIGNMS application appends a digital signature to the self-extracting executable distribution file (or a copy of the self-extracting executable distribution file if a destination argument is provided as will be explained below). Self-extracting executable destination files that are copied and digitally signed have the original self-extracting executable destination file name and a *.SEC suffix. Once the *.SEC file is verified against its digital signature, the self-extracting executable distribution file is renamed to its original name and the .SEC suffix is truncated.

The digital signature is created with a Secure Hashing Algorithm (SHA) hash process. The SHA hash process returns a value that is encrypted using a private 1024-bit RSA encryption key. The SHA hash process is a one-way process (i.e., cannot be un-hashed) that is used to compute a secure hash value for the self-extracting, executable distribution file. SHA hashing and RSA private key encryption are known in the art.

The RSA encryption is completed with a 1024-bit private key known only to the software distributor. This helps reduce the risk of accidental or intentional corruption or tampering since only the software distributor knows the value for the private key used. The distributed software is decrypted using a published public RSA decryption key.

Figure 8:
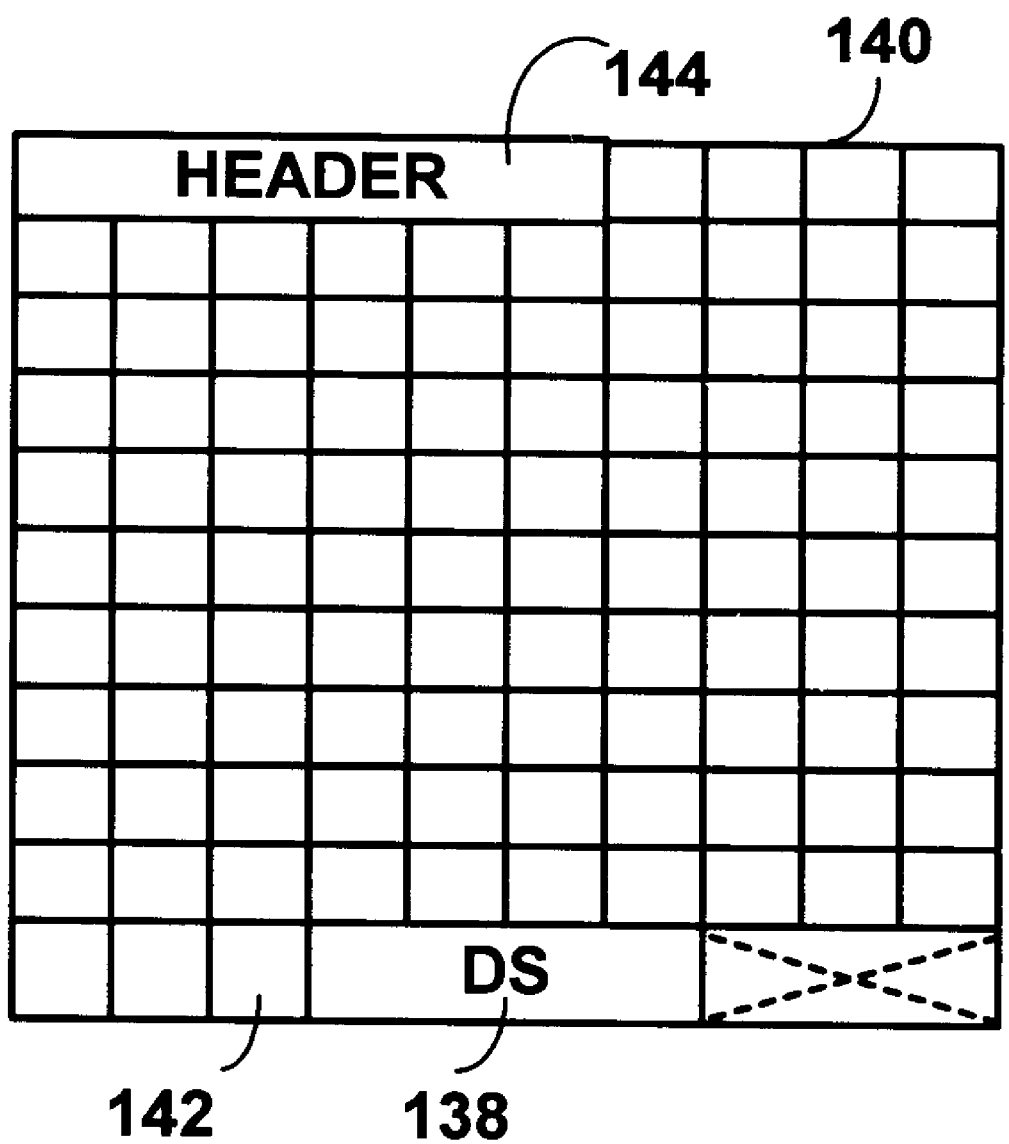
FIG. 8 is a block diagram illustrating an executable file format.

As is shown in FIG. 8, the digital signature 138 is added to the bottom of the self-extracting executable distribution file 140 after the last data block 142 of the executable (*.EXE) information (i.e., the extractor program and the cabinet file). Since most executable (*.EXE) files have a header 144 that indicates the number of data blocks of executable information, adding the digital signature 138 after the last data block of executable information 142 prevents complaints or problems with most existing tools (e.g., VIRUS checkers) and operating systems which process executable information.

SIGNMS will also detect a file that is already signed and prevent the user from adding a second digital signature. An "/F" switch overrides this detection and will allow SIGNMS to replace the digital signature with a new signature if the file is already signed. Replacing a signature is useful if the private encryption key becomes compromised at some time, and there is a need to introduce a new private key to re-sign all files previously signed. The SIGNMS application is summarized below.

signms [/F] source [destination]

Switches:
[/F] An optional switch to replace the digital signature if the file is already signed with a digital signature.

Parameters:
source The name of the file to be signed.
[destination] An optional name for the signed output file. If the destination is not provided then the signature will be added onto the source file.

Returning to FIG. 7, the secure, self-extracting executable distribution file (e.g., file.SEC) is transmitted 146 from the server computer 118 over a computer network (e.g., the Internet) to the client computer 112 and passed to the network browser 110. However, as was described above, the user can delay transmission of the requested software until a later more convenient time (see FIG. 5).

When the network browser receives the secure, self-extracting executable distribution file, the digital signature is verified 148. The digital signature is verified with a digital signature verification function called "MSSFVerify( )". The MSSFVerify( ) function is stored in a Windows library called MSSFCHEK.LIB.

A call to MSSFVerify( ) by the network browser 110 decrypts with a public RSA decryption key, the encrypted original SHA hash value received in the self-extracting distribution file. One or more public RSA decryption keys are typically published by the software distributor The private key is not published. The SHA hashing process is then used to compute a second SHA hash value. The second SHA hash value is compared with the original SHA value sent in the digital signature.

If the second (i.e., computed) SHA hash value and the original SHA hash value are identical 150, the self-extracting executable distribution file is deemed secure and free from accidental or intentional corruption. The self-extracting executable distribution file is then executed to install the software requested by the user 152. If the second SHA hash value and the original hash value are not identical, then the self-extracting executable distribution file is deemed to have been corrupted or altered and insecure, and thus is rejected and deleted 152.

The MSSFVerify( ) function operates in two modes; a normal mode and verify only mode. The normal mode removes the digital signature, verifies it, and renames the self-extracting executable distribution file if the file was signed by SIGNMS using the destination file argument. The verify only mode verifies the digital signature without removing the digital signature or renaming the file. If the file was signed in-situ, then both modes are the same. The MSSFVerify( ) function is summarized below.

MSSFVerify(PMSSFVY*pmssf);

Parameters:
*pmssf A pointer to a MSSFVY data structure containing the name of the file to be checked, a buffer for the resulting file name, flags, error codes, and a function to be called at intervals for status updates and to provide the ability to cancel the operation.

Return Value:
Returns zero on success. On failure, it returns a non-zero value indicating the reason for the failure.

If the digital signature is verified as correct, the extractor in the self-extracting executable distribution file (e.g., WEXTRACT) extracts and decompresses (if compression was used) all the files in the cabinet file, and automatically starts the installation program (if any) that was specified (e.g., setup.exe/RUN) when the cabinet file was created.

Alternatively, the user can also be prompted by the network browser to start the installation program, or start the installation program manually at a later time.

The installation program installs the software in the appropriate directories on the client computer. In addition, the installation program is typically configured to clean-up, update, or delete any unnecessary or out-of-date files after installation.

Software sent from a server application on a server computer or from an update service in a secure, self-extracting, executable distribution file gives the user confidence that the requested software will not damage or cause problems on the user's computer. Thus, the user is more likely to accept electronic copies of new or enhanced versions of computer software. The software distributor, by signing the software with a digital signature encrypted with a private RSA encryption key, also has a high degree of confidence that any software sent over a public computer network (Internet or intranet) will arrive without being accidentally or intentionally corrupted.

With automatic downloading and installation of computer software from the update or network service provider service, the user is relieved from the burden of obtaining computer software (e.g., on storage media, by downloading from a bulletin board or on-line service, etc.), and installing the computer software on the user or client network computer. Once a user purchases computer software, periodic accessing of the update service or a network service provider will keep the user current and up-to-date.

It should be understood that the programs, processes, or methods described herein are not related or limited to any particular type of computer apparatus, unless indicated otherwise. Various types of general purpose or specialized computer apparatus may be used with or perform operations in accordance with the teachings described herein.

In view of the wide variety of embodiments to which the principles of this invention can be applied, it should be understood that the illustrated embodiments are exemplary only, and should not be taken as limiting the scope of our invention. Rather, we claim as our invention all such embodiments as come within the scope and spirit of the following claims and equivalents thereto.

We claim:

1. In a local computer with a network browser in communication with a remote server computer over a computer network, a method of installing software on the local computer, the method comprising:
   during browsing of a hypertext document with the network browser, encountering with the network browser at the local computer a hypertext tag indicative of a software program resident on the server computer to be automatically installed at the local computer, wherein the hypertext tag resides in the hypertext document;
   responsive to encountering the hypertext tag in the hypertext document, automatically downloading from the server computer an executable file for installing the software program; and
   executing the executable file at the client computer to install the software program at the client computer.

2. A computer readable medium having computer-executable instructions for performing the steps of the method in claim 1.

3. The method of claim 1 further comprising:
   sending a file request from the local computer to the server computer upon encountering the tag; and
   generating at the server computer the executable file in response to the file request, wherein the executing step comprises:
   executing at the client computer the executable file to extract an installation utility and a grouping of software from the executable file; and
   automatically executing the installation utility at the local computer to install the grouping of software at the local computer.

4. The method of claim 1 wherein the executable file has a digital signature and wherein the method further comprises:
   verifying the digital signature before the executing step to determine if the digital signature is proper; and
   inhibiting the executing step if the verifying step indicates the digital signature is improper.

5. In a local computer system with an operating system, a network browser for browsing hypertext pages available from remote computer systems connected to the local computer over a network, the network browser operable for acquiring an executable file comprising a software upgrade from a server computer, the browser comprising:
   a facility for identifying a tag indicative of a software upgrade when encountered in one of the hypertext pages, the tag indicative of the executable file's location;
   a facility for downloading the executable file from the server computer automatically upon encountering the tag;
   a facility for automatically submitting the executable file to the operating system for execution to install the software upgrade at the local computer after it is downloaded by the downloading facility.

6. The network browser of claim 5 wherein the tag comprises a description of the software upgrade and a time stamp indicating a date of the software upgrade.

7. A computer-readable medium having stored thereon a hypertext page with a tag data structure for identifying to a browsing client computer a software upgrade to be installed at the client computer automatically upon browsing the page, the data structure comprising:
   a tag name instructive to automatically install the software upgrade; and
   a link to a server computer on which a downloadable file comprising the software upgrade is stored.

8. The computer-readable medium of claim 7 wherein the data structure further comprises:
   a field indicative of a time stamp associated with the software upgrade; and
   a field describing the upgrade.

9. The computer-readable medium of claim 7 wherein the tag data structure is in HTML, format to trigger automatic downloading and installation of the software from the server when the tag data structure is encountered by an HTML browser recognizing the tag name.

10. The computer-readable medium of claim 9 wherein the software upgrade is a viewer for use with the HTML browser.

11. In a local computer system having a network browsing system, a method of delivering a remotely-located piece of software to the local computer, the method comprising:
    downloading a document;
    encountering in the document a tag identifying a location of the remotely-located piece of software; and
    responsive to said encountering, downloading to the local computer system the piece of software from the location identified by the tag.

12. A computer-readable medium having computer-executable instructions for performing the actions of the method in claim 11.

13. The method of claim 11 wherein the piece of software is embedded in a file comprising an installation utility for installing the piece of software and an extractor positioned in the file to be executed upon execution of the file, wherein the extractor extracts the piece of software and the installation utility from the file when executed, the file further comprising a section of executable code for automatically invoking the installation utility after the extractor extracts the piece of software and the installation utility from the file, the method further comprising:

executing the file to execute the extractor to extract the piece of software and the installation utility from the file and automatically invoke the installation utility to install the extracted piece of software.

14. In a local computer system having a network browsing system comprising a set of installed software, a method of updating the network browsing system with the network browsing system, the method comprising:

downloading a document to the local computer system;

with the network browsing system, encountering in the document a tag identifying a location of a file comprising a remotely-located piece of software, wherein the remotely-located piece of software updates the set of installed software to update the network browsing system; and responsive to said encountering, downloading the file from the location identified by the tag to the local computer system to install the piece of software identified by the tag on the local computer system to update the network browsing system.

15. A computer-readable medium having computer-executable instructions for performing the actions of the method in claim 14.

16. The method of claim 14 wherein the document is downloaded by the network browsing system.

17. The method of claim 14 wherein the location is specified in the tag as a conventional hypertext markup language uniform resource locator; and said downloading retrieves the file via the hypertext markup language uniform resource locator.

18. The method of claim 14 wherein the tag further identifies a title associated with the remotely-located piece of software.

19. The method of claim 14 wherein the piece of software is a viewer for the network browsing system.

20. The method of claim 14 wherein the piece of software is embedded in a file comprising an installation utility for installing the piece of software and an extractor positioned in the file to be executed upon execution of the file, wherein the extractor extracts the piece of software and the installation utility from the file when executed, the file further comprising a section of executable code for automatically invoking the installation utility after the extractor extracts the piece of software and the installation utility from the file, the method further comprising:

executing the file to execute the extractor to extract the piece of software and the installation utility from the file and automatically invoke the installation utility to install the extracted piece of software.

21. In a local computer, a self-updating network browser system comprising:

document downloading means for downloading and rendering remotely-located documents;

tag detection means for detecting in the documents a tag specifying a location of a remotely-located software program upgrading the browser system; and software program downloading means to download the remotely-located software program upgrading the browser system from the location specified to the local computer.

22. The self-updating network browser system of claim 21 wherein the software program is a viewer for rendering elements embedded within the remotely-located documents.

23. The self-updating network browser system of claim 21 further comprising:

a program launcher for executing the software program downloaded to the local computer to install an upgrade to the network browser system.

* * * * *

UNITED STATES PATENT AND TRADEMARK OFFICE
CERTIFICATE OF CORRECTION

PATENT NO. : 6,256,668 B1
DATED : July 3, 2001
INVENTOR(S) : Slivka et al.

It is certified that error appears in the above-identified patent and that said Letters Patent is hereby corrected as shown below:

Title page,
References Cited, under OTHER PUBLICATIONS,
*"American Online's Internet"* should read -- *America Online's Internet* --.
*"American Online for Macintosh Tour Guide"* should read -- *America Online for Macintosh Tour Guide* --.

Column 2,
Line 35, "c.g." should read -- e.g. --.

Column 14,
Line 58, the ellipsis should be deleted.

Column 15,
Line 1, "bins\setup.exe" should read -- bin\setup.exe --.
Line 9, the ellipsis should be deleted.
Line 10, "bin\setup.inf" should read -- bin\setup.in . . . --.
Line 26, "diamond\ffile.ddf" should read -- diamond /f file.ddf --.
Line 38, "diamond/source_file" should read -- diamond /f source --.
Line 59, "WEXTRACT IProgram" should read -- WEXTRACT Program --.

Column 20,
Line 49, "HTML, format" should read -- HTML format --.

Signed and Sealed this

Twelfth Day of March, 2002

Attest:

Attesting Officer

JAMES E. ROGAN
*Director of the United States Patent and Trademark Office*